US012755890B2

(12) United States Patent

Lytle et al.

(10) Patent No.: US 12,755,890 B2

(45) Date of Patent: Oct. 6, 2026

(54) ELECTRO-MAGNETIC COIL WITH COOLANT PERMEABILITY

(71) Applicants: Magnebotix Ag, Schlieren (CH); NANOFLEX ROBOTICS AG, Zürich ETH-Zentrum (CH)

(72) Inventors: Sean Lyttle, Zurich (CH); Jonas Baumann, Zurich (CH); Simone Gervasoni, Claro (CH); Cedric Fischer, Schlieren (CH); Christophe Chautems, Zurich (CH)

(73) Assignees: Magnebotix AG, Schlieren (CH); NanoFlex Robotics AG, Zurich (CH)

( * ) Notice: Subject to any disclaimer, the term of this patent is extended or adjusted under 35 U.S.C. 154(b) by 1105 days.

(21) Appl. No.: 17/795,984

(22) PCT Filed: Jan. 28, 2020

(86) PCT No.: PCT/EP2020/052019

§ 371 (c)(1),
(2) Date: Jul. 28, 2022

(87) PCT Pub. No.: WO2021/151468

PCT Pub. Date: Aug. 5, 2021

(65) Prior Publication Data

US 2023/0054802 A1 Feb. 23, 2023

(51) Int. Cl.

| | |
|---|---|
| ***H01F 27/28*** | (2006.01) |
| ***H01F 5/06*** | (2006.01) |
| ***H01F 27/10*** | (2006.01) |
| ***H01F 41/077*** | (2016.01) |

(52) U.S. Cl.

CPC ........... *H01F 27/2876* (2013.01); *H01F 5/06* (2013.01); *H01F 27/10* (2013.01); *H01F 27/2823* (2013.01); *H01F 41/077* (2016.01)

(58) Field of Classification Search

CPC ........ H01F 27/2876; H01F 5/06; H01F 27/10; H01F 27/2823

USPC ........................................................... 336/57

See application file for complete search history.

(56) References Cited

U.S. PATENT DOCUMENTS

| | | | | |
|---|---|---|---|---|
| 2,632,041 | A | 3/1953 | Bilodeau | |
| 2,710,947 | A | 6/1955 | Gaston | |
| 2,917,701 | A * | 12/1959 | Salton | H01F 27/12 361/37 |
| 3,056,071 | A | 9/1962 | Baker et al. | |
| 3,170,134 | A * | 2/1965 | Palmer | H01F 27/322 336/60 |

(Continued)

FOREIGN PATENT DOCUMENTS

| | | | |
|---|---|---|---|
| CN | 103326482 | A * | 9/2013 |
| DE | 889649 | | 9/1953 |

(Continued)

*Primary Examiner* — Shawki S Ismail

*Assistant Examiner* — Joselito S. Baisa

(74) *Attorney, Agent, or Firm* — The Webb Law Firm

(57) ABSTRACT

An electro-magnetic coil with coolant permeability wound using insulated wire includes a plurality of radially arranged layers and a plurality of axially arranged turns of the insulated wire per layer, wherein the insulated wire has a plurality of sections along its length with different cross-sections for any pair of two adjacent sections that collectively form into axial and radial coolant channels as the wire is wound around a core.

13 Claims, 10 Drawing Sheets

(56) References Cited

U.S. PATENT DOCUMENTS

| | | | | | |
|---|---|---|---|---|---|
| 3,579,162 | A | | 5/1971 | Savkar | |
| 3,781,739 | A | * | 12/1973 | Meyer | H01F 27/343 29/605 |
| 4,529,837 | A | * | 7/1985 | Borden | H01B 12/02 57/215 |
| 5,171,942 | A | * | 12/1992 | Powers | H01B 5/08 57/215 |
| 7,023,312 | B1 | | 4/2006 | Anoue et al. | |
| 8,284,006 | B2 | | 10/2012 | Bacarisse | |
| 10,438,734 | B2 | * | 10/2019 | Bel Fdhila | H01F 27/12 |
| 2002/0186115 | A1 | | 12/2002 | Runge | |
| 2005/0229381 | A1 | * | 10/2005 | Kato | H02K 15/35 29/596 |
| 2011/0162423 | A1 | | 7/2011 | Kamibayashi et al. | |

FOREIGN PATENT DOCUMENTS

| | | | | | |
|---|---|---|---|---|---|
| EP | 12542 | A | * | 6/1980 | |
| EP | 2330603 | A1 | | 6/2011 | |
| JP | H06119817 | A | * | 4/1994 | H01B 7/0815 |
| JP | H1126253 | A | | 1/1999 | |
| JP | 2008108522 | A | | 5/2005 | |
| KR | 1020060079148 | A | | 7/2006 | |
| WO | WO-2004062065 | A1 | * | 7/2004 | H02K 15/0431 |

* cited by examiner

ELECTRO-MAGNETIC COIL WITH COOLANT PERMEABILITY

CROSS-REFERENCE TO RELATED APPLICATION

This application is the United States national phase of International Application No. PCT/EP 2020/052019 filed Jan. 28, 2020, the disclosure of which is hereby incorporated by reference in its entirety.

BACKGROUND OF THE INVENTION

Field of the Invention

The present invention relates to an electro-magnetic coil with coolant permeability, an insulated wire building up such electromagnetic coils, as well as a method of producing such an electro-magnetic coil with coolant permeability.

Description of Related Art

Electromagnetic coils are a basic component of a vast array of modern technologies. High-power electromagnetic coils in particular are used extensively in the fields of medicine, particle physics, micromanipulation, and many others. Such coils comprise electromagnetic coil windings that are often actively cooled with a fluid to allow the winding to withstand high current density without overheating.

Various strategies exist to make this cooling maximally effective. Generally speaking, it is advantageous to increase the rate of coolant flow and the area of the wire in contact with the coolant, while at the same time maximizing proximity of wire and coolant, i.e. any heat conducted to the coolant should have to traverse as short a distance through the wire as possible. Also, it is of course preferable to use standard wires and winding techniques if possible.

A number of designs and configurations for electromagnetic coil windings have been proposed in the literature, the most relevant of which are described here.

U.S. Pat. No. 2,710,947 describes a coil wound with two strips of material simultaneously—the first being an uninsulated conductor, and the second being a corrugated insulator—such that the corrugated insulating strip forms axial cooling channels in the coil structure.

EP 2,330,603 describes a transformer coil wound with two conductive strips, at least one of which is corrugated in order to form axially-extending coolant channels.

U.S. Pat. No. 8,284,006 describes an air-cooled transformer coil having spacer elements between winding layers that form axial passages for air to flow.

Many different approaches to create cooling channels by embedding different spacer elements within the winding are known. One example is U.S. Pat. No. 7,023,312 disclosing thermoplastic ducts spaced between the layers of conductive winding.

U.S. Pat. No. 3,579,162 describes a transformer coil having axial cooling ducts around which the coil wires are wound.

U.S. Pat. No. 2,632,041 describes a transformer having winding sections separated by axial spacer elements, thus forming radial cooling channels.

U.S. Pat. No. 3,056,071 describes an electromagnetic coil formed with a wire having shallow groove-shaped cutouts that form axial cooling channels.

SUMMARY OF THE INVENTION

The electro-magnetic coils described in the prior art require complex wire geometries and/or winding techniques.

In light of the aforementioned prior art and the limitations thereof, it is inter alia an object of this invention to provide a coil whose coolant permeability emerges intrinsically.

An electro-magnetic coil with coolant permeability according to the invention is wound using insulated wire, comprising a plurality of radially arranged layers and a plurality of axially arranged turns of the insulated wire per layer, wherein the insulated wire has a plurality of sections along its length with different cross-sections for any pair of two adjacent sections.

A coil according to the invention comprises a coil whose coolant permeability emerges intrinsically as a result of the wire's varying cross-sectional shape. The difference of the cross-section of adjacent section can comprise a variation of height or a variation of width or a variation of both dimensions. Such an embodiment according to the invention is characterized by combined axial and radial cooling channels providing a coil winding with coolant permeability in both the axial and radial directions.

It is a further object of the invention to provide a coolant permeable coil that can be formed from standard, readily available insulated wires using common coil winding techniques.

According to an embodiment of the invention, a coil is wound from a wire having periodically varying cross-sectional shape and/or area along its length. This wire can be formed by drawing a standard insulated wire with uniform cross-section through a forming tool, which periodically compresses sections of the wire along its height, width or both. As the wire is wound in multiple rows over multiple layers, the varying cross-sections form coolant channels in both axial and radial directions. The shape and periodicity of the cross-sections can be optimized for various purposes. For instance, if it was advantageous for the majority of coolant to flow in the radial direction, the cross-sectional parameters of the wire could be adjusted to form primarily radial coolant channels, and vice versa.

The coil according to the inventions results in a large heat transfer area with coolant distributed throughout the winding volume. It does not require separate spacer elements which simplifies the winding process and allows maximal packing density (volume copper/total volume) to achieve maximum magnetic field generation per given input power. The optimization is related to both the coil itself and the method of winding it. The fact that it does not require spacers and can be wound using standard practices is related to the method, but the realization of optimal packing density is a property of the winding configuration itself, regardless of how it is actually achieved.

The coil preferably comprises a housing with at least one inlet and at least one outlet, connected to gaps in axial and/or radial directions of the coil creating channels for a coolant fluid, wherein the inlet(s) and outlet(s) are adapted to be connected to a coolant circuit to pump a coolant fluid through the channels of the coil to cool the coil.

The inlet(s) and outlet(s) can be provided in longitudinal direction at opposite sides of the housing of the coil, e.g. at the same radial direction from the core of the coil, wherein the coolant is moved through the winding in axial direction by applying an axial pressure gradient and the radial cooling channels are used to distribute flow evenly over radial flow cross-section.

The inlet(s) and outlet(s) can also be provided in different radial distances from the core of the coil, then the coolant is moved through the winding in radial direction (inward or outward) by applying a radial pressure gradient and the axial cooling channels are used to distribute flow evenly over axial flow cross-section.

It is a further object of the invention to provide an insulated wire to build-up an improved coil with coolant permeability.

Such an insulated wire has an initial round shape before deformation for optimal price of the raw material. It can also have an initial rectangular, especially square shape. If the wire used is approximately rectangular before deformation then an optimum packing density results.

An insulated wire used to form a coolant-permeable electro-magnetic coil comprises alternating sections of round or rectangular shaped wire and deformed sections compressed along the height or width of the wire. The cross-section reduction along the height and the width of the wire can be anti-aligned, wherein the wire is wide where it is flat or wherein the wire is narrow where it is high, achieving an approximate constant total wire cross-section of the wire.

Alternatively, the wire deformation along the height and the width of the wire can be aligned, wherein the wire is wide where it is high and wherein the wire is narrow where it is flat to achieve the best fluid permeability.

It is a further object of the invention to provide an improved method of producing a coil with coolant permeability.

This object is achieved by a method to produce a coil comprising the steps of compressing the wire using a wire-forming tool consisting in one embodiment of two wheels that have profiled surfaces corresponding to the desired wire thickness.

This method allows winding a coil from a single, continuous, insulated wire in traditional manner, but without requiring the use of additional spacing elements. The deformation process of an ordinary insulated wire takes place at the same time as winding by pressing and deforming the wire right before winding it.

According to one embodiment, the parameters of the wire taken from the group including thickness, deformation periodicity, deformed section length, deformed section width and inner diameter of the winding are chosen at random. This allows creating coolant channels which form stochastically. While the resultant channels will still be very effective, they will likely not be optimal.

According to another embodiment, a relationship between the wire parameters and the resulting coil is defined beforehand that ensure the channels will continue to align with themselves over multiple layers, in order to realize an ideal channel configuration. One such relationship comprises in its simplest form to set L=2*pi*t, where L is the length of the periodic pattern, and t is the maximum thickness (height) of the wire, with pi being Ludolph's number. At the same time the circumference of the core on which the wire is wound is chosen to be a multiple of length L so that deformed and un-deformed sections between windings in the same layer align. In other words L is a divisor of the value of the circumference of the core on which the wire is wound. This alignment is still essentially achieved for a high number of layers increasing the diameter of the wound wire layers.

The coolant channels can be formed from the group encompassing radial coolant channels between subsequent layers of wires, axial coolant channels between adjacent turns of wires, and cross-section coolant channels between two adjacent turns and between two subsequent layers.

The cross-section of the wire can change between undeformed circular sections and two different deformed section, i.e. oval or elliptic sections with the longer axis direction in either layer or turn orientation.

An electromagnetic coil winding according to the invention has intrinsically emerging radial and axial coolant channels. The coil is wound from a wire with varying cross-sectional shape, said wire consisting of alternating deformed and undeformed sections that collectively form into axial and radial coolant channels as the wire is wound around a core.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF THE INVENTION

Figure 1A:
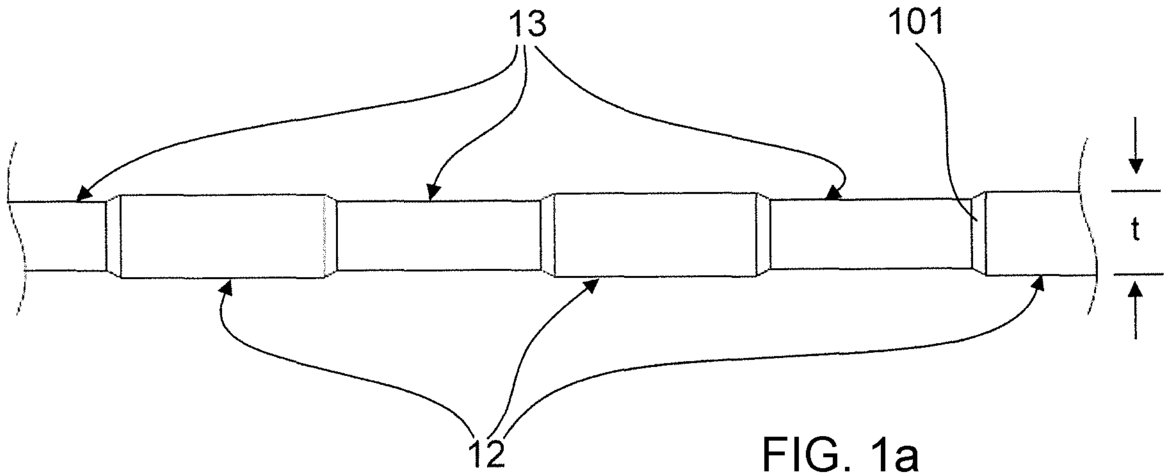
FIG. 1*a* is a top view on a portion of a first embodiment of the wire, depicting the alternating deformed and undeformed portions of the wire.
Figure 1B:
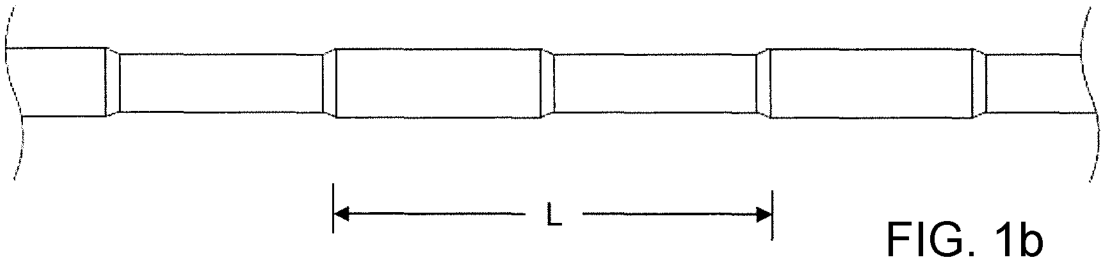
FIG. 1*b* is a side view of the wire according to FIG. 1*a*.
Figure 1C:
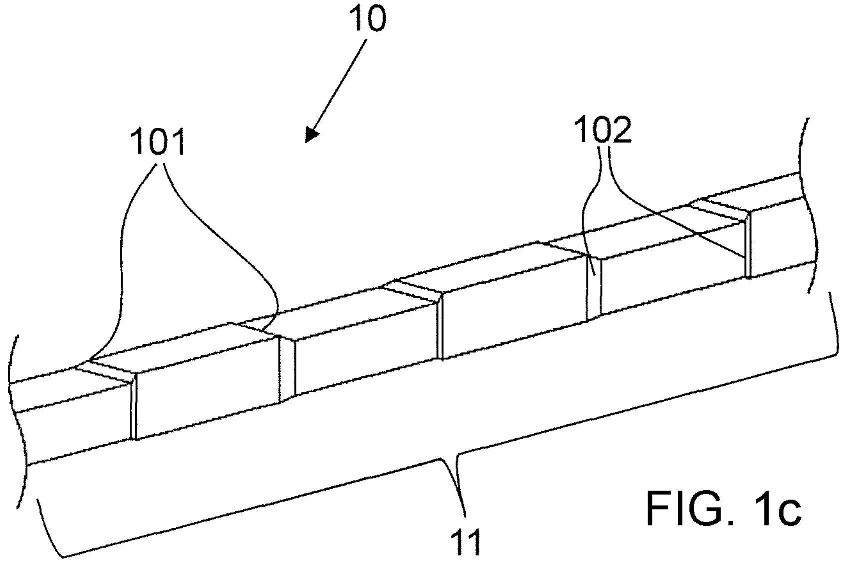
FIG. 1*c* is a perspective view of the wire according to FIG. 1*a*.

FIGS. 1*a*, 1*b* and 1*c* show a first embodiment 10 of a wire 11 with varying cross-section in a top view, side view and perspective view, respectively. In fact, it shows a delimited portion of the wire, depicting the alternating deformed and un-deformed sections of the wire.

Figure 11:
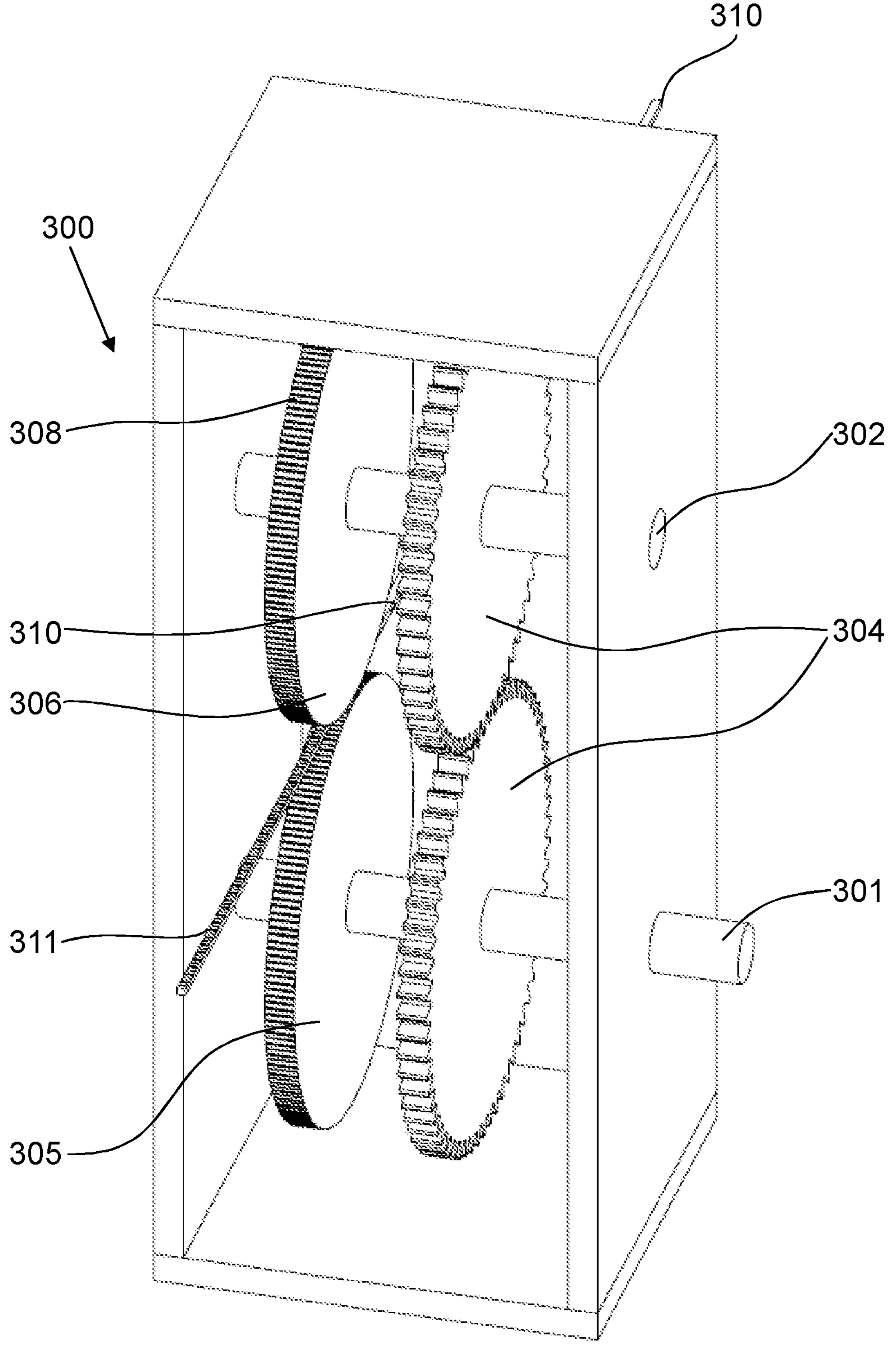
FIG. 11 is a schematic perspective view of parts of a wire forming apparatus.
Figure 12:
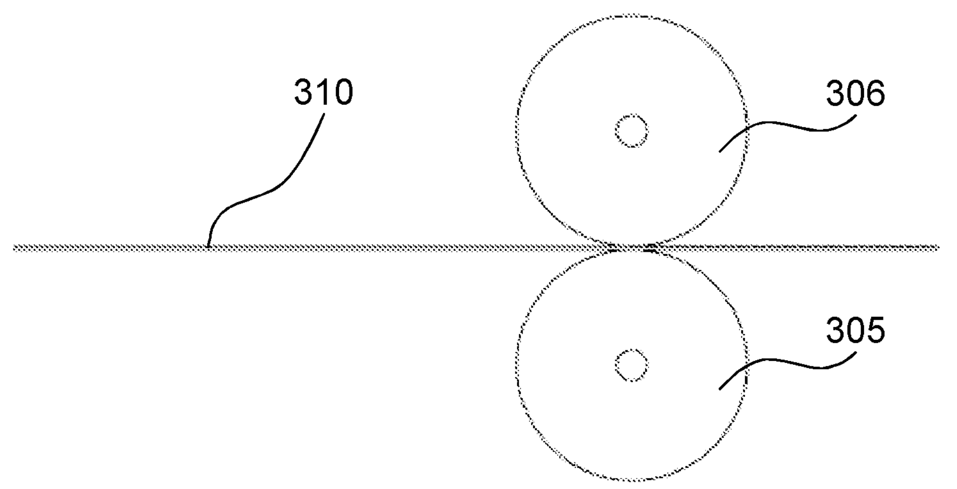
FIG. 12 is a schematic side-view of the forming wheels of the apparatus of FIG. 11 with a wire.
Figure 13:
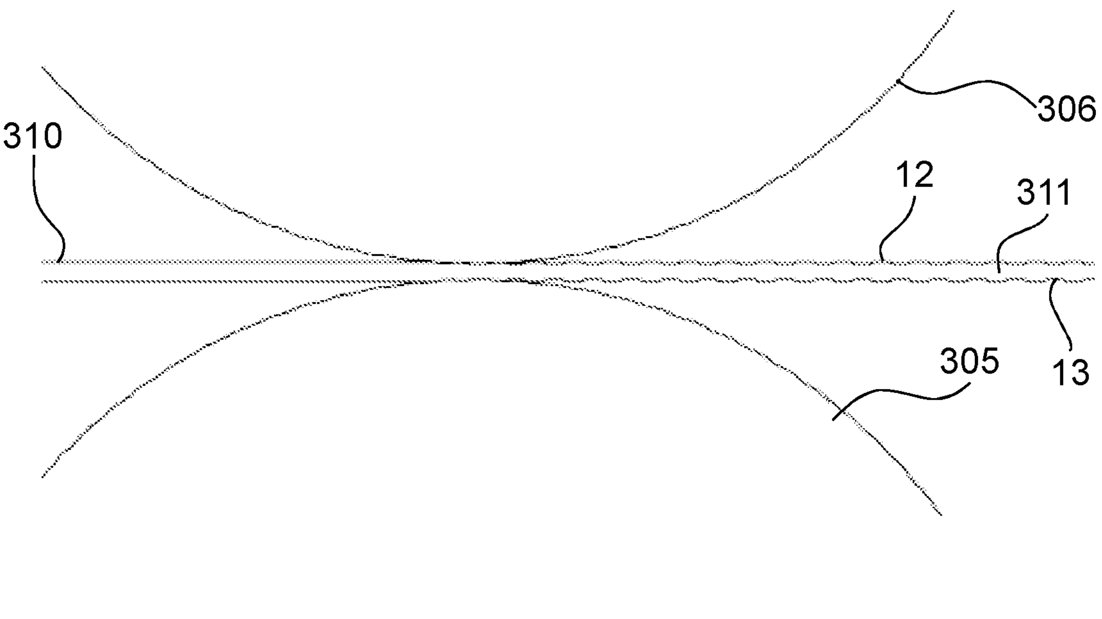
FIG. 13 is a schematic enlarged view of FIG. 12.

FIG. 1 shows at the same time the result of an embodiment of a method according to the invention. The wire 11 is initially a commercially available insulated wire. At first the wire's 11 cross-section is uniform throughout its length. The cross-section of the wire and its insulation, seen as one entity, can be square as shown with the wire 11 in FIG. 1*a*. The cross-section can also be rounded and especially a circle. As the wire 11 is wound onto the magnet core forming a coil, it is passed through a forming tool 300 as shown in FIG. 11, periodically deforming sections of the wire 11 such that untouched areas 12 having the original cross-section (e.g. square or circular or a minimally deformed cross-section) alternate with deformed areas 13 having a new cross-section. The forming tool 300 will be described later on in connection with FIGS. 12 and 13 showing one embodiment how to create a deformed wire 311.

The initial wire 310 can be rectangular or oblong/elliptical, especially it can be an initial wire which is insulated. The cross-section of the deformed section 13 of FIG. 13 as well as of FIG. 1 is flatter and wider than the original section 12. Between the sections 12 and 13 are present deformed upper shoulders 101 and side shoulders 102, mainly comprising inclined surfaces between the corresponding adjacent surfaces. Adjacent shoulders 101 and 102 have opposite oriented inclinations. In case of a rounded wire 11 (not shown in the drawings), the shoulders are more complex tridimensional curves.

Of course it is possible to start with a wire 11 having a rectangular cross-section and deform it into an essentially square one. The deformation process is not intended to damage the insulation.

It is possible that the main part of the deformation is exerted within the insulation coating.

Figure 2A:
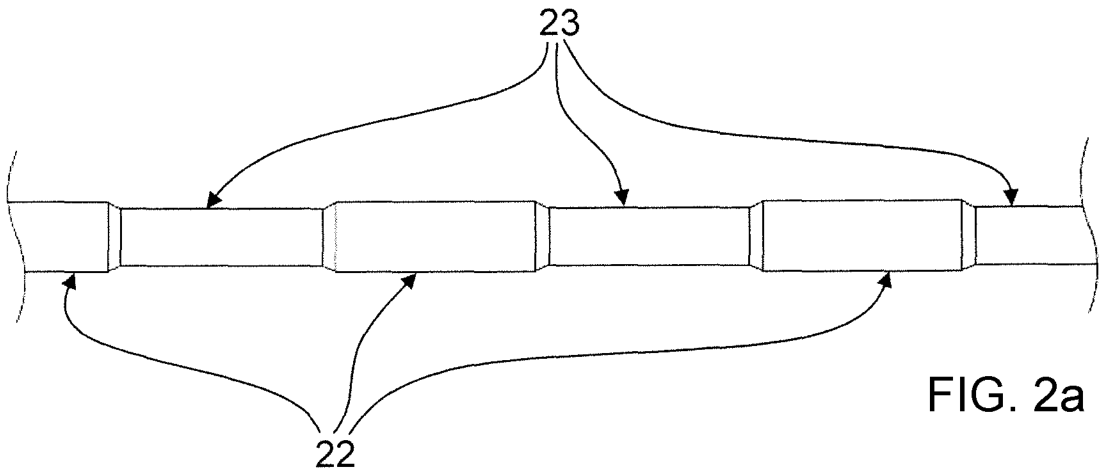
FIG. 2*a* is a top view on a portion of a second embodiment of the wire, depicting the alternating deformed and undeformed sections of the wire.
Figure 2B:
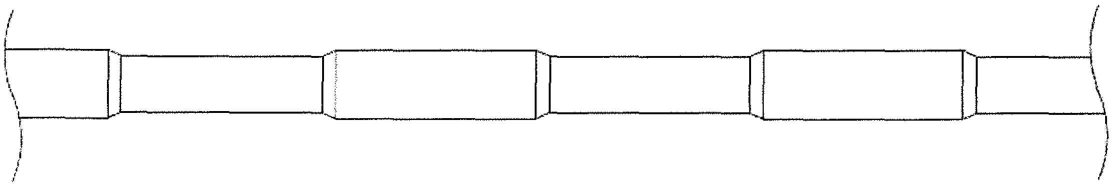
FIG. 2*b* is a side view of the wire according to FIG. 2*a*.
Figure 2C:
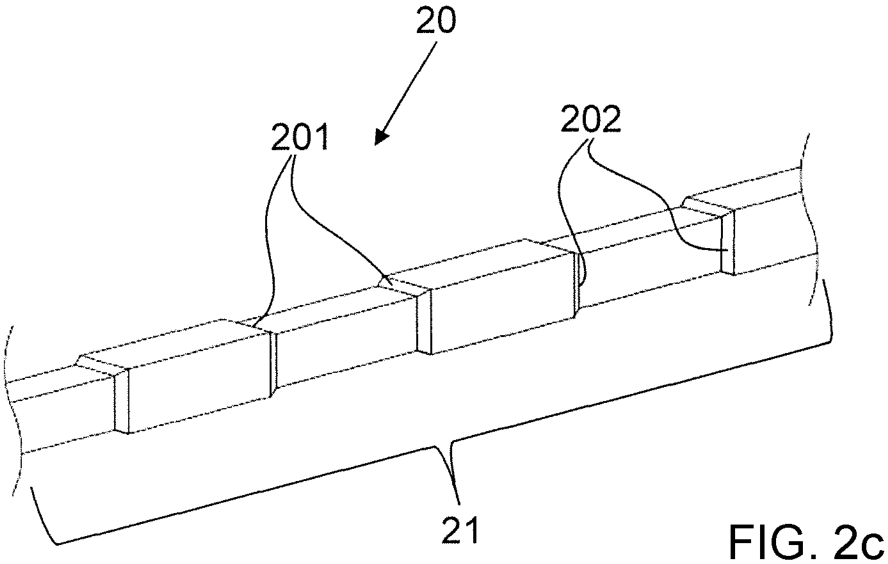
FIG. 2*c* is a perspective view of the wire according to FIG. 2*a*.

FIGS. 2A, 2*b* and 2*c* show a second embodiment 20 of a wire with varying cross-section in a top view, a side view and a perspective view, respectively. The wire 21 is a commercially available insulated wire. At first the wire 21's cross-section is uniform throughout its length. As the wire 21 is wound onto the magnet core, it is periodically deformed such that untouched areas 22 having substantially the original cross-section alternate with deformed areas 23 having a new cross-section. The cross-section of the deformed section 23 is both flatter and narrower than the original section 22, i.e. it is compressed to a smaller cross-section area. In other words, the tool used to deform the wire 21 deforms the wire 21 along both its height and width.

Between the sections 22 and 23 are present deformed upper shoulders 201 and side shoulders 202, mainly comprising inclined surfaces between the corresponding adjacent surfaces. Adjacent shoulders 201 and 202 have an inclination directed into the same direction, i.e. reducing the cross-sectional area from a section 22 to a section 23 and increasing the cross-sectional area from section 23 to section 22.

Figure 3:
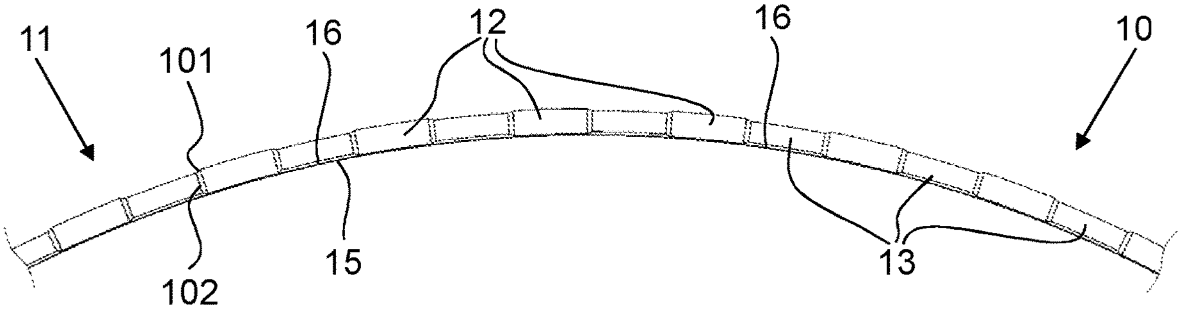
FIG. 3 is a side view on a portion of one layer of the wire from FIG. 1 wrapped around a cylindrical core.

FIG. 3 is a side view of a portion of one layer of a wire embodiment 10 where wire 11 is wrapped around a cylindrical magnet core 15. It is clear that axial channels 16 will be formed between the wire 11 and the core's 15 surface, as well as between subsequent winding layers (not shown in FIG. 3). Similar channels will also be formed, if an embodiment according to FIG. 3 is provided with the wire 20 of FIG. 2.

Figure 4:
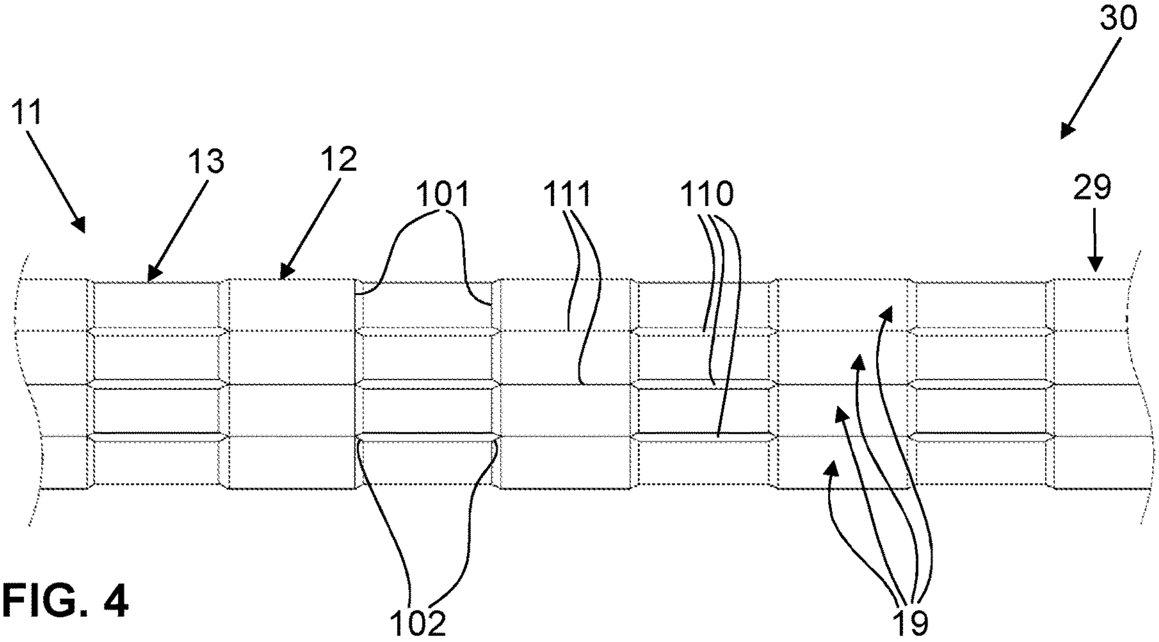
FIG. 4 is a top view on a portion of four adjacent windings of one layer of a coil formed from the wire depicted in FIG. 1, wherein the wire parameters are chosen such that the deformed sections in adjacent windings are aligned.

FIG. 4 is a top view on a portion of four adjacent windings or turns 19 of one layer 29 of a coil formed from the wire 11 of the wire embodiment 10 depicted in FIG. 1, wherein the wire parameters in connection with the core (not shown) are chosen such that the deformed sections 13 in adjacent windings are aligned. Of course, the undeformed sections 12 are then aligned as well. The deformed sections 13 are aligned with each other, forming clearly defined radial coolant channels 110, whereas the side surfaces of the adjacent undeformed sections 12 are touching one the other at contact surfaces 111.

When a second layer of windings (here four turns 19) is arranged on the first layer 29 shown in FIG. 4, then further contact surfaces 111 are built on the top surfaces of the undeformed sections 12, if the alignment is chosen that the deformed section 13 of the subsequent layer is positioned with its longer portion of the cross-section as bottom surface on said top surface.

Figure 5:
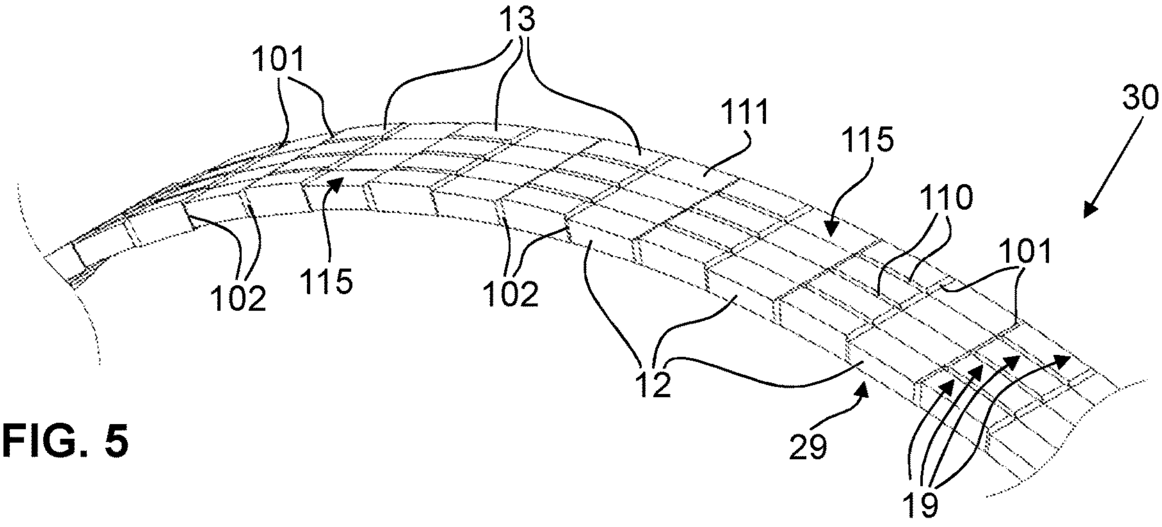
FIG. 5 is a perspective view of the four aligned windings of FIG. 4.

FIG. 5 is a perspective view of the four aligned windings 19 of one single layer 29 of FIG. 4, wherein both axial coolant channels 115 and radial coolant channels 110 are visible.

Figure 6:
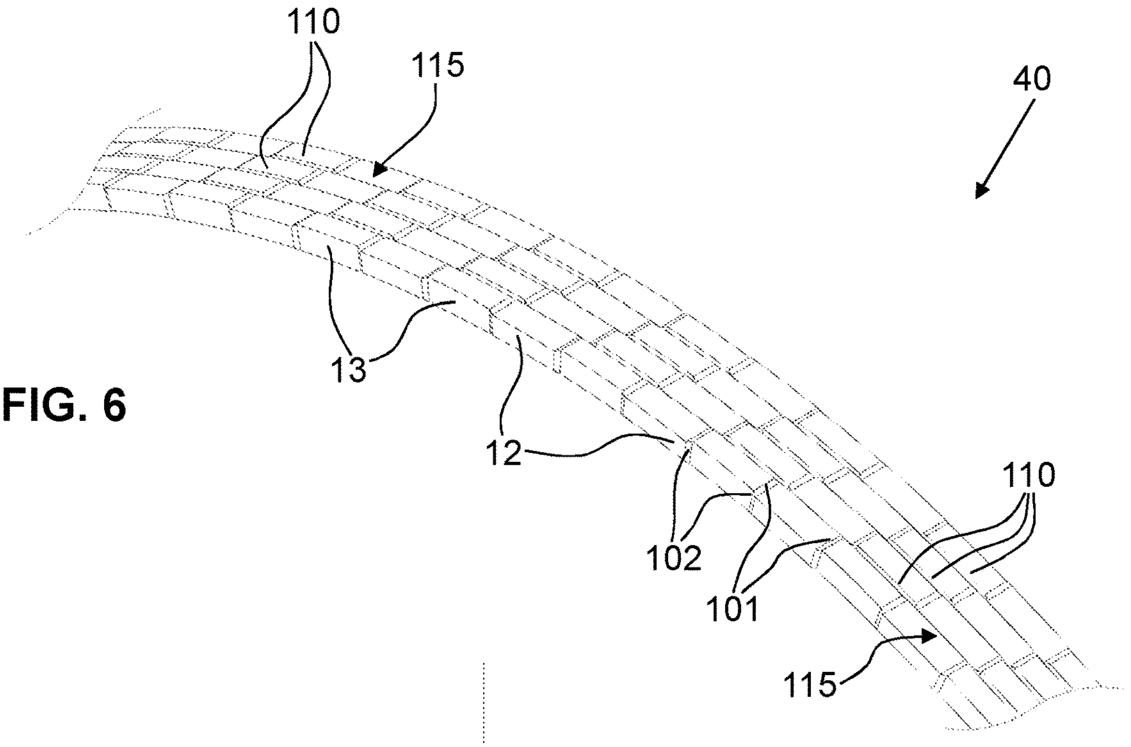
FIG. 6 is a perspective view on portions of four adjacent windings of one layer of a coil formed from the wire depicted in FIG. 1, wherein the adjacent deformed sections are not aligned.

FIG. 6 is a perspective view of portions of four adjacent windings 19 of one layer 29 of a coil formed from the wire depicted in FIG. 1, wherein the adjacent deformed sections 13 are not aligned. In this case, of course, the undeformed sections 12 are not aligned as well in adjacent layers. Still, it is clear that both axial 115 and radial 110 coolant channels will emerge.

Figure 7A:
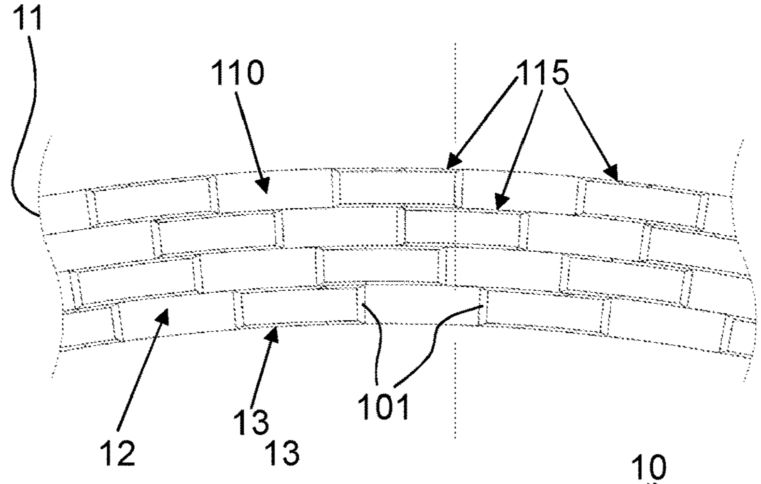
FIG. 7*a* is a top view on a 4×4 portion of a coil with four adjacent windings in four layers formed from the wire depicted in FIG. 1 wherein the alignment of coolant channels is not controlled.
Figure 7B:
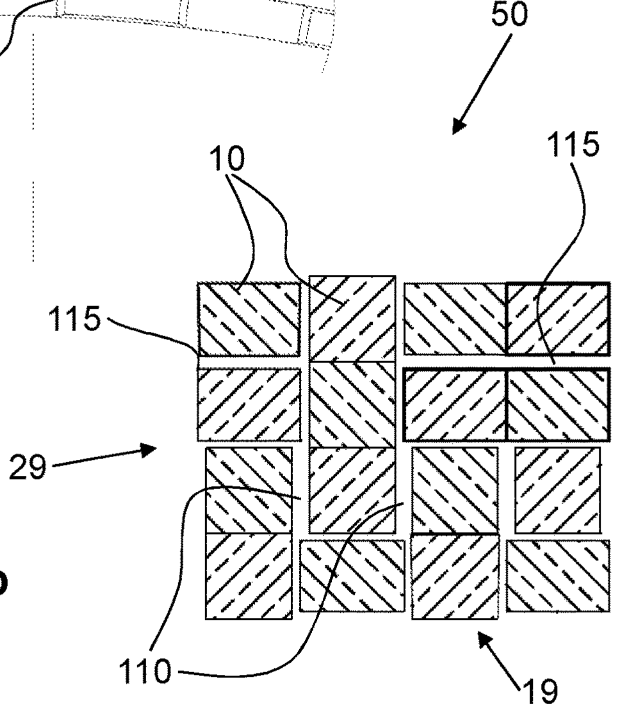
FIG. 7*b* is a cross-sectional view of the 4×4 portion of FIG. 7A showing that the channels are allowed to form stochastically.

FIG. 7*a* is a top view of a 4×4 portion of a coil with four adjacent windings 19 in four layers 29 formed from the wire embodiment 10 depicted in FIG. 1 wherein the alignment of coolant channels 110 and 115 is not controlled and FIG. 7*b* is a cross-sectional view of the 4×4 portion of FIG. 7*a* showing that the channels 110 and 115 are allowed to form stochastically, since the alignment of the deformed sections 13 of the wire 11 is entirely random. The 4×4 array is chosen to illustrate the emerging cooling channels 110 and 115. In a typical application both the actual number of windings per layer and as well as the actual number of layers can be many times larger, e.g. especially between 10 and 100 layers 29 with between 10 and 500 windings or turns 19. The use of a 4 times 4 array of windings and layers has been chosen to illustrate the applying principles, it could be understood to show a detail of a larger coil.

Figure 8:
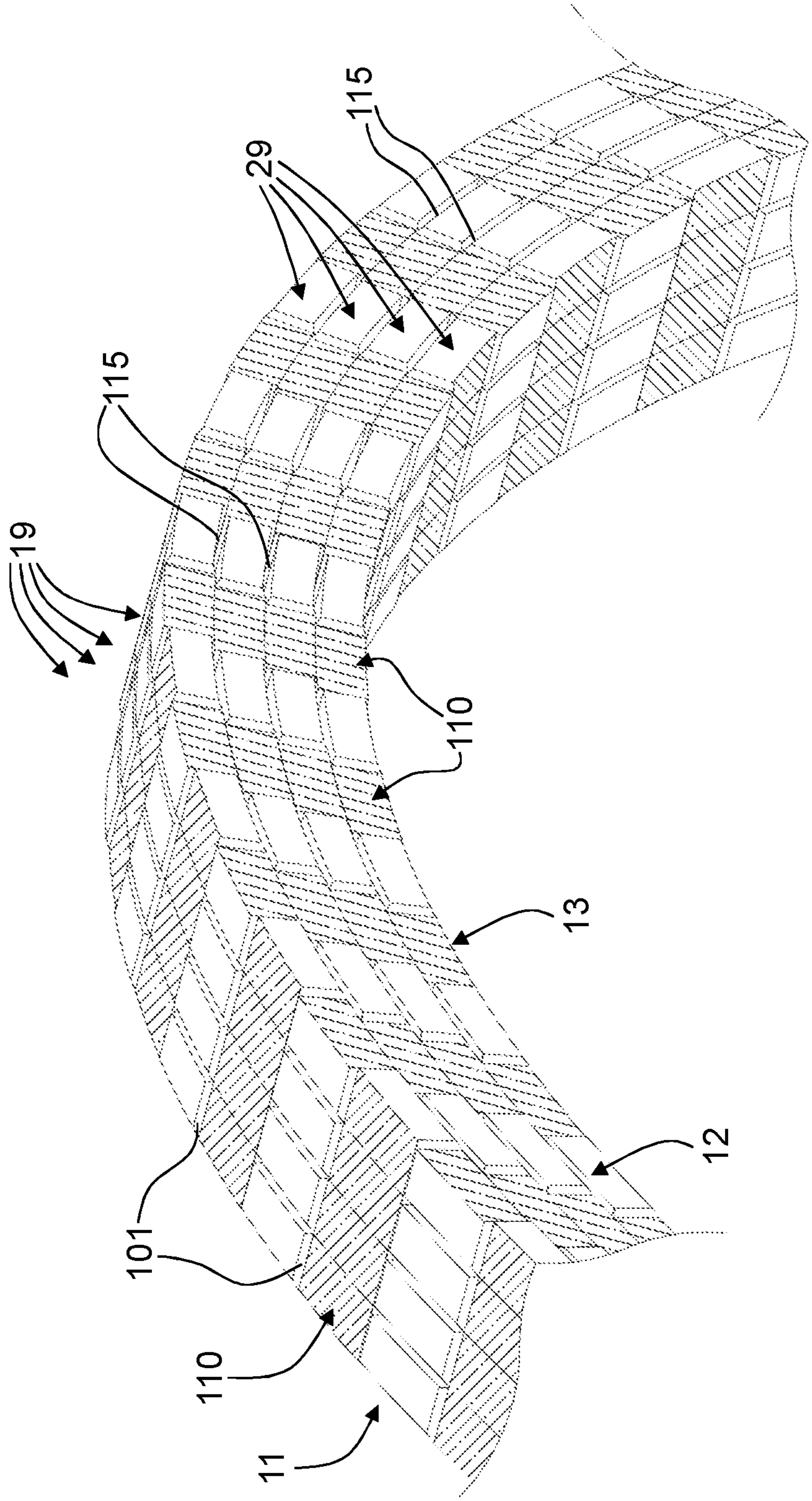
FIG. 8 is a perspective view of a 4×4 portion of a coil formed from the wire depicted in FIG. 1 wherein adjacent windings are aligned, forming well-defined coolant channels in both the axial and radial directions.

FIG. 8 is a perspective view of a 4×4 portion of a coil formed from the wire embodiment 10 depicted in FIG. 1 wherein four adjacent windings 19 are aligned, forming well-defined coolant channels in both the axial and radial directions. The alignment within the array of wires of adjacent windings is controlled such that the deformed sections 13 align throughout winding layers 29. The channels in both the radial and axial directions are clearly marked with reference numerals 110 and 115, respectively. The hatched surfaces are representing the deformed surface of the smaller dimension.

Figure 9:
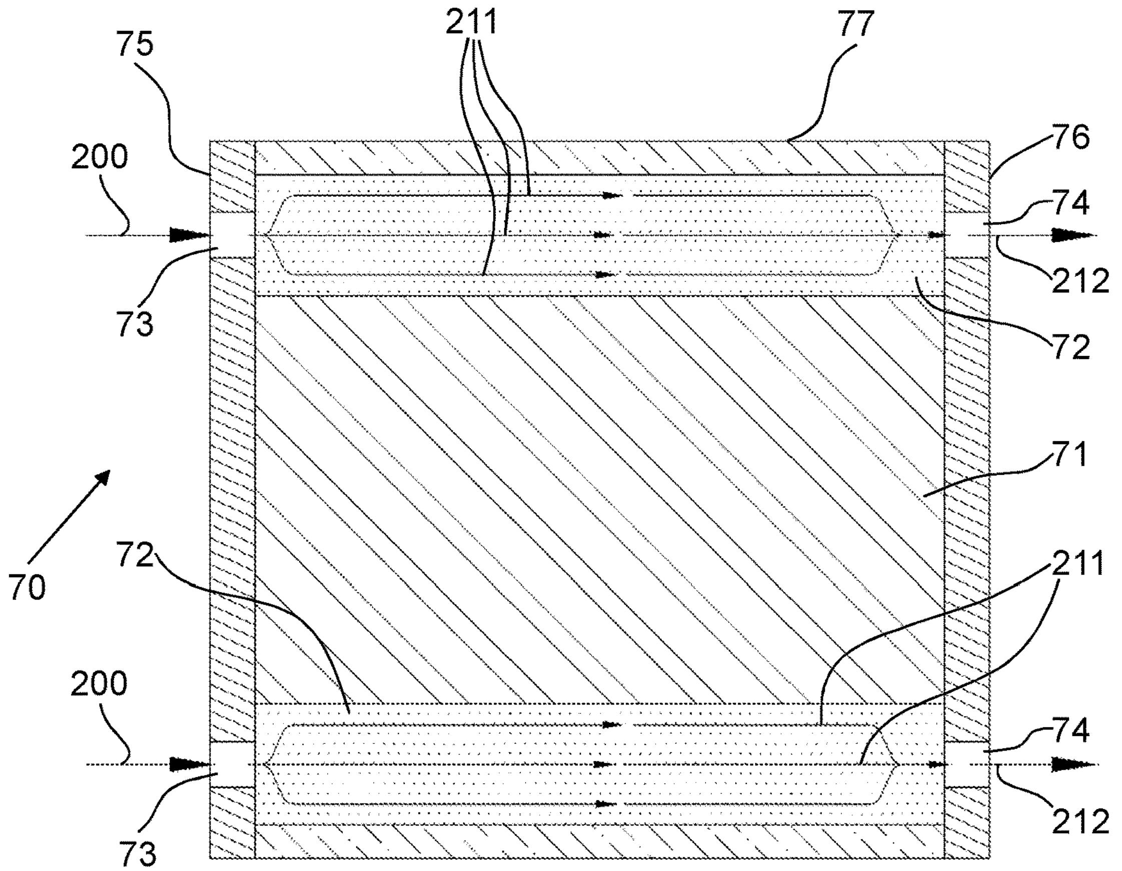
FIG. 9 is a schematic cross-sectional view of a first embodiment of an electromagnetic coil having a permeable winding wherein the coolant flow is primarily axial.

FIG. 9 is a schematic cross-sectional view of a first embodiment of an electromagnetic coil 70 having a permeable winding 72 wherein the coolant flow is primarily axial as represented through the arrows with the reference numerals 211. The first magnet embodiment 70 has a permeable winding 72 wound around a magnet core 71. Winding 72 is shown as filling up the room between core 71, end caps 75, 76 as well as outer tube 77; but of course, winding 72 is built from a plurality of wire windings in a plurality of wire layers as shown in FIG. 8 with wires 10 or 20 from FIG. 1 or 2 or similar embodiments.

End caps 75 and 76 form the structural support for the winding, and together with outer tube 77 form a sealed volume around winding 72. Coolant is pumped as represented by inlet flow 200 through inlet(s) 73 in the endcap 75 and out through outlet(s) 74 in the endcap 76 as outlet flow 212. As the coolant enters the winding, it disperses radially and flows axially as axial flow 211 to outlet 74. Variations of the design are possible such as where inlet 73 and outlet 74 are on the same side of the magnet 71 by either segmenting the wire volume to form a U-shaped flow path that returns to the inlet side or by embedding flow channels to lead the coolant back to the inlet side at endcap 75 either through the core 71 or around the winding.

Figure 10:
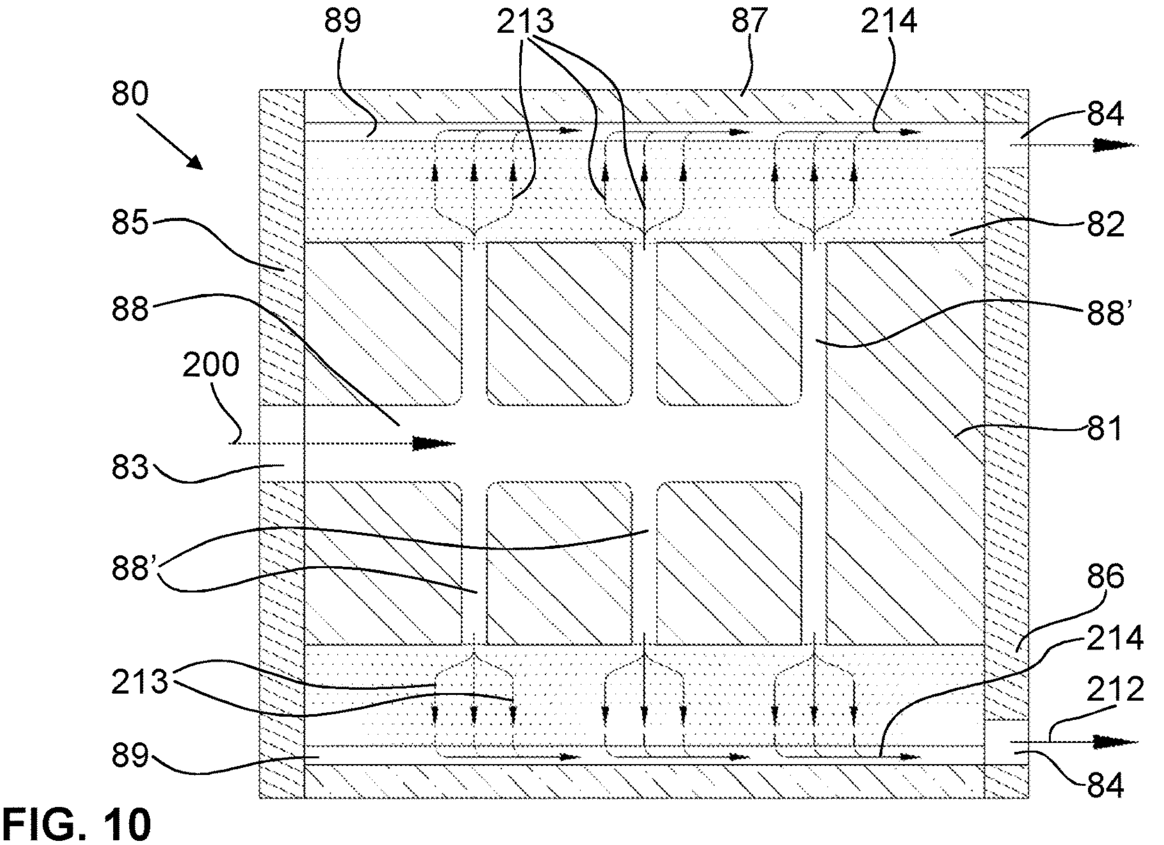
FIG. 10 is a schematic cross-sectional view of a further embodiment of an electromagnetic coil having a permeable winding wherein the coolant flow is primarily radial.

FIG. 10 is a schematic cross-sectional view of a further embodiment of an electromagnetic coil 80 having a permeable winding wherein the coolant flow 213 is primarily radial. The second magnet embodiment 80 comprises a permeable winding 82 wound around a magnet core 81. Endcaps 85 and 86, together with outer tube 87 form a sealed volume around winding 82. Winding 82 shown as plain surface between elements 81, 85, 86 and 87 is as in FIG. 9 built from a plurality of wire windings in a plurality of layers. Coolant is pumped through inlet(s) 83 and through radial cooling channels 88' in core 81. As the coolant leaves the core 81 and enters the winding 82, it disperses axially and flows radially into groove(s) 89 which are cut into outer tube 87 and which lead in a redirected axial coolant flow 214 to outlet(s) 84 in end cap 86.

FIG. 11 is a schematic perspective view of parts of a wire forming apparatus, FIG. 12 is a schematic side-view of the forming wheels 305 and 306 of the apparatus of FIG. 11 with a wire, and FIG. 13 is a schematic enlarged view of FIG. 12. In an embodiment, the winding tool 300 as shown in the schematic perspective view of the main parts in FIG. 13 comprises a set of two forming wheels 305 and 306 having a pattern of ridges 308 on their outer surface. The initial preferably insulated wire 310 may be drawn through the forming wheels 305 and 306 passively or the wheels may be driven actively by means of a drive shaft 301. As the wire 310 passes through the forming wheels 305 and 306, its cross-section is periodically deformed by the ridges 308 on the wheels 305 and 306. A synchronization mechanism presented here as two meshing gears 304 ensures that the forming wheels 305 and 306 rotate together and do not become out of sync. One of the meshing gears 304 is mounted on the driving shaft 301 whereas the second of the meshing gears 304 is mounted on an upper axle 302. The forming wheels 305 and 306 are mounted in parallel onto these axles 301 and 302, respectively.

Figure 14:
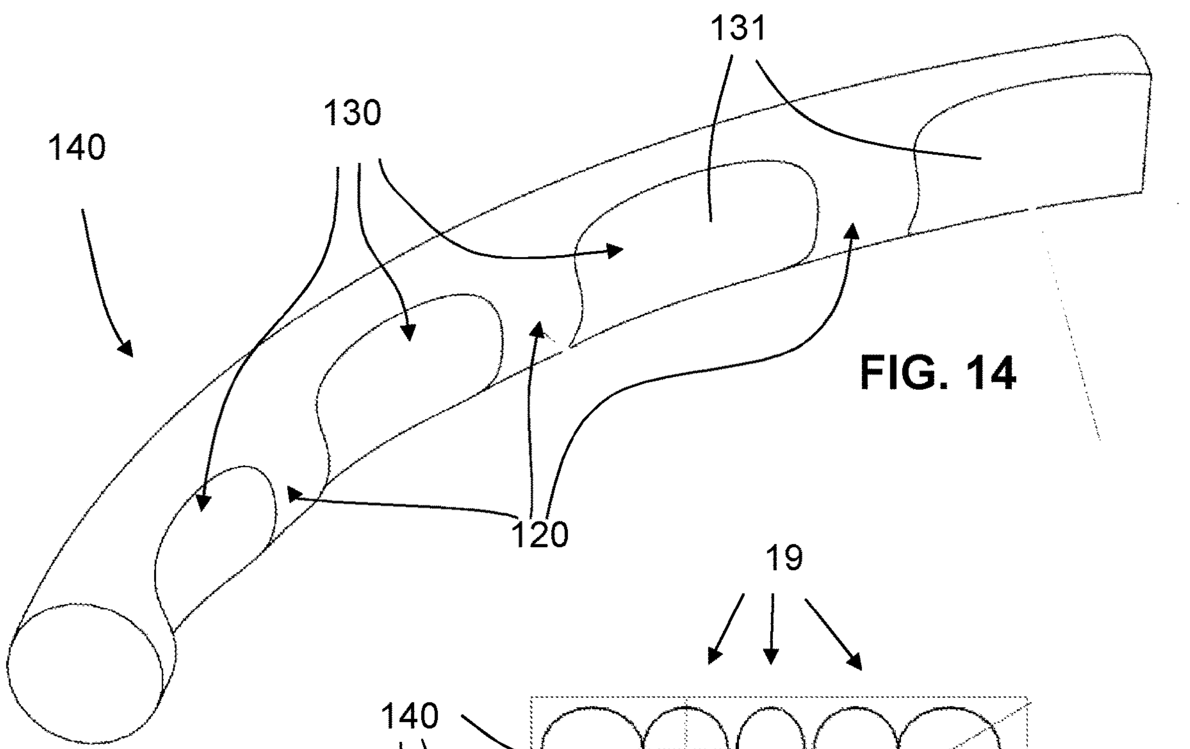
FIG. 14 is a perspective view on a portion of a third embodiment of the wire, depicting the alternating deformed and un-deformed portions of the wire.

FIG. 14 is a perspective view on a portion of a third embodiment of the wire 140, depicting the alternating deformed and un-deformed portions of the wire 140. The wire 140 has a round circular form in the undeformed wire portions 120. The deformed wire portions 130 are delimited in the drawing of FIG. 14 by a line indicating a gradually rounded recess without an edge.

Figure 15:
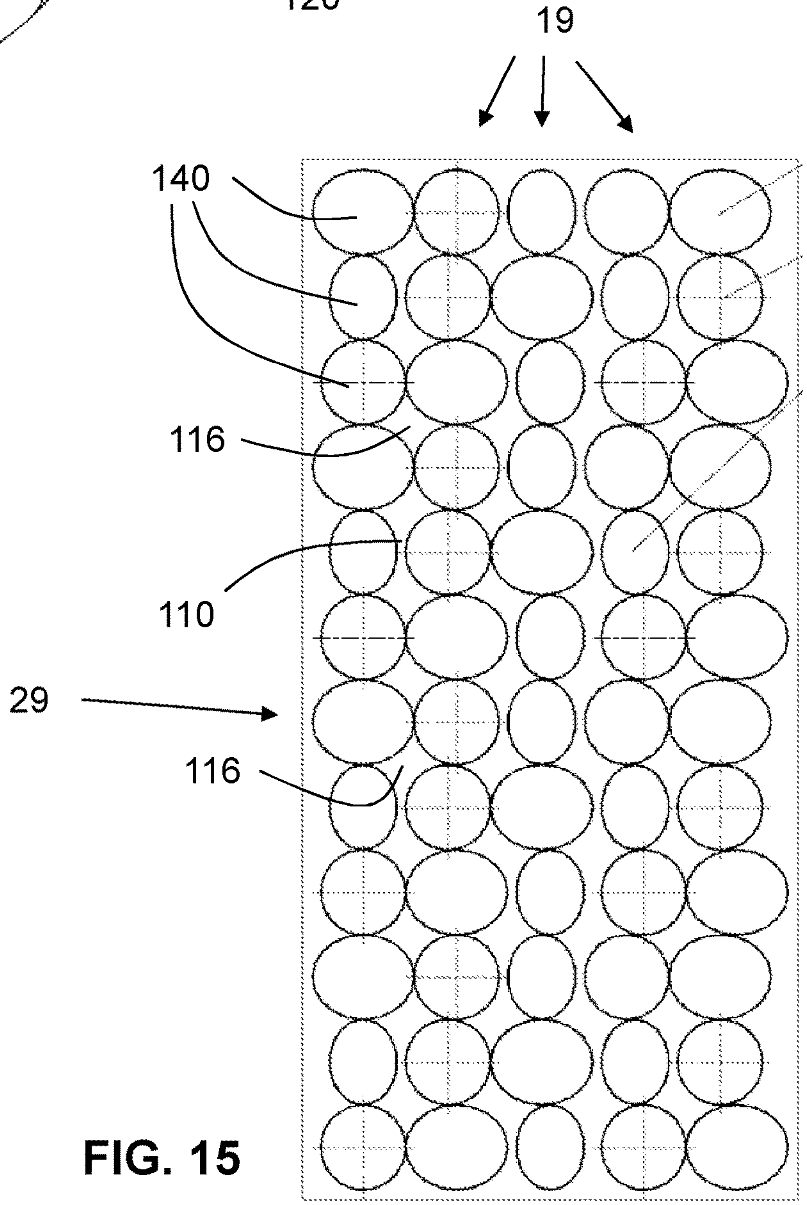
FIG. 15 is a cross sectional view on a 5×12 portion of a coil with five adjacent windings in nine layers formed from the wire depicted in FIG. 14 wherein the alignment of coolant channels is only controlled over the different layers.

FIG. 15 is a cross sectional view on a 5×12 portion of a coil with five adjacent windings or turns 19 in twelve layers 29 formed from the wire 140 depicted in FIG. 14 wherein the alignment of coolant channels 110 and 116 is only controlled over the different layers. Reference numerals 140 in FIG. 15 indicate towards three different wires 140; one wire 140 with a round circular cross section (indicated with a crosshair) and two oval or elliptic wires 140 having the largest diameter in two directions one perpendicular to the other. Arrow 19 indicate the adjacent turns, here five turns 19. There are twelve layers 29. In the embodiment of FIG. 15 every subsequent layer is directly contacting the more inner layer so that there are no axial coolant channels 115. However, there are a plurality of radial coolant channels 110. In view of the round wires 140 changing their cross-section from circular to elliptic or oval in the two perpendicular directions, there appear cross-section coolant channels 116 at the intersection of two adjacent turns 19 of wires 140 of two adjacent layers 29. The number of adjacent turns 19 can be chosen in all embodiments from several to 10 or more The number of adjacent layers 29 can be chosen in all embodiments from several to 10 or 100 or more, creating arrays of e.g. 10 times 100 wires 140 (or wires 10 or wires 20).

Figure 16:
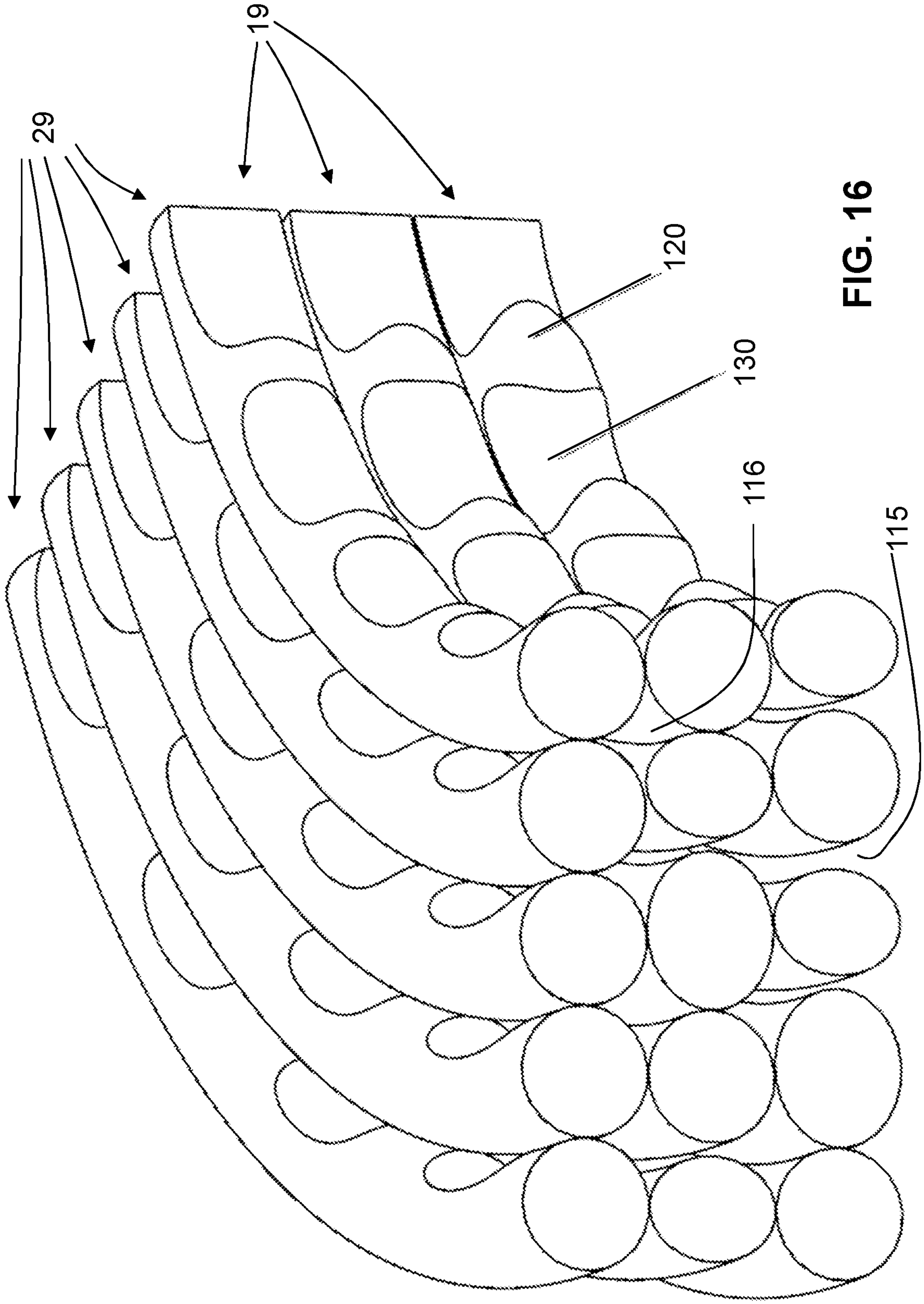
FIG. 16 is a perspective view of a 3×5 portion of a coil formed from the wire depicted in FIG. 14 wherein adjacent windings are aligned, forming well-defined axial coolant channels and cross-section coolant channels.

Finally, FIG. 16 is a perspective view of a 3×5 portion of a coil formed from the wire 140 depicted in FIG. 14 wherein adjacent windings are aligned, forming well-defined axial coolant channels 115 and cross-section coolant channels 116. In other words, here, the adjacent windings of wires 140 in turns 19 are touching each other, but between different layers there appear axial coolant channels 115. In any case, in view of the round wires 140 there are cross-section coolant channels 116 at the intersections.

The invention claimed is:

1. An electro-magnetic coil with coolant permeability wound using insulated wire, the electro-magnetic coil comprising:

- a plurality of radially arranged layers of the insulated wire, and
- a plurality of axially arranged turns of the insulated wire per radially arranged layer,
- wherein the insulated wire has a plurality of sections along a length thereof with different cross-sections for any pair of two adjacent sections such that empty spaces formed by the axially- and radially-adjacent cross-sections of insulated wire collectively form coolant channels;
- wherein adjacent sections comprise a local wire deformation being coordinated with the tangential position on the coil and thus creating cooling channels in axial and/or radial direction in a coordinated way; and
- wherein the coil has a core on which the wire is wound, where l=2*pi*t, where l is the length of the periodic pattern, and t is the maximum thickness of the wire, with pi being Ludolph's number, wherein l is a divider of the circumference of the core on which the wire is wound, so that deformed and un-deformed sections between windings in the same layer align.

2. The coil according to claim 1, wherein the difference of the cross-section for any pair of two adjacent sections comprises a variation of height, a variation of width, or a variation of both dimensions.

3. The coil according to claim 1, comprising a housing with at least one inlet and at least one outlet, connected to gaps in axial and/or radial direction of the coil creating said coolant channels for a coolant fluid, wherein the inlet(s) and outlet(s) are adapted to be connected to a coolant circuit to pump a coolant fluid through the coolant channels of the coil to cool the coil.

4. The coil according to claim 3, wherein a fluid pump is provided to be attached to the at least one inlet for pumping the coolant through the windings in an axial direction by applying an axial pressure gradient between the inlet(s) and outlet(s), and the radial cooling channels are adapted to distribute flow evenly over radial flow cross-section.

5. The coil according to claim 3, wherein a fluid pump is provided to be attached to the at least one inlet for pumping the coolant through the windings in a radial direction by applying a radial pressure gradient between the inlet(s) and outlet(s) and the axial cooling channels are adapted to distribute flow evenly over axial flow cross-section.

6. The coil according to claim 1, wherein adjacent sections comprise a local wire deformation being not coordinated with the tangential position on the coil and thus stochastically creating gaps in axial and radial direction.

7. The coil according to claim 1, wherein the coolant channels are from the group encompassing radial coolant channels between subsequent layers of wires, axial coolant channels between adjacent turns of wires, and cross-section coolant channels between two adjacent turns and between two subsequent layers.

8. The coil according to claim 1, wherein the cross-section of the wire changes between undeformed sections being circular and deformed sections being oval or elliptic with the longer axis direction in layer or turn orientation.

9. An insulated wire for use to build an electro-magnetic coil according to claim 1, comprising sections of round or rectangular shaped wire alternating with sections compressed along the wire's width and/or height such that the ratio between the periodic length of the alternating pattern and the wire thickness produces a regular pattern of axial and radial coolant channels.

10. The wire according to claim 9, wherein the cross-section reduction along the height and the width of the wire are anti-aligned, wherein the section of the wire is wide where it is flat and wherein the section of the wire is narrow where it is high, achieving an approximate constant total wire cross-section of the wire.

11. The wire according to claim 9, wherein the wire deformation along the height and the width of the wire are aligned, wherein the section of the wire is wide where it is high and wherein the section of the wire is narrow where it is flat to achieve the best fluid permeability.

12. A method to create a wire described in claim 9 wherein the wire is deformed by compressing the wire using a wire flattener consisting of two wheels that have an actuation mechanism to vary the distance between the wheels as the wire is passed through.

13. A method to produce a coil according to claim 1, comprising the steps of compressing the wire using a wire flattener consisting of two wheels that have profiled surfaces corresponding to the desired wire thickness.

* * * * *